United States Patent
Blanco Gonzalez et al.

(10) Patent No.: US 9,605,111 B2
(45) Date of Patent: Mar. 28, 2017

(54) PROCESS FOR PREPARING HIGHLY ACTIVE DOUBLE METAL CYANIDE CATALYSTS AND THEIR USE IN THE SYNTHESIS OF POLYETHER POLYOLS

(71) Applicant: REPSOL, S.A., Madrid (ES)

(72) Inventors: Maria Dolores Blanco Gonzalez, Mostoles-Madrid (ES); Fernando Prieto Noguera, Madrid (ES)

(73) Assignee: REPSOL, S.A., Madrid (ES)

( * ) Notice: Subject to any disclaimer, the term of this patent is extended or adjusted under 35 U.S.C. 154(b) by 0 days.

(21) Appl. No.: 14/944,648

(22) Filed: Nov. 18, 2015

(65) Prior Publication Data

US 2016/0068631 A1    Mar. 10, 2016

Related U.S. Application Data

(62) Division of application No. 14/117,052, filed as application No. PCT/EP2012/059081 on May 16, 2012, now Pat. No. 9,221,947.

(30) Foreign Application Priority Data

May 17, 2011    (EP) ..................... 11382156

(51) Int. Cl.
*C08G 65/26* (2006.01)
*B01J 31/02* (2006.01)
*B01J 31/22* (2006.01)
*C08G 65/00* (2006.01)

(52) U.S. Cl.
CPC ...... *C08G 65/2663* (2013.01); *B01J 31/0212* (2013.01); *B01J 31/2213* (2013.01); *C08G 65/2606* (2013.01); *B01J 2231/14* (2013.01); *B01J 2531/26* (2013.01); *B01J 2531/845* (2013.01)

(58) Field of Classification Search
CPC .................................................. C08G 65/26
USPC ............................................ 568/620; 423/364
See application file for complete search history.

(56) References Cited

U.S. PATENT DOCUMENTS

2014/0243497 A1    8/2014    Blanco Gonzalez et al.

FOREIGN PATENT DOCUMENTS

| EP | 0700949 A2 | 3/1996 |
|----|------------|--------|
| EP | 0894108 A1 | 2/1999 |
| WO | 0189685 A1 | 11/2001 |

OTHER PUBLICATIONS

Le-Khac, B., "Metal cyanide catalysts for epoxide polymerization and their preparation"; 1996; ARCO Chemicia Technology, USA; Chem Abstract 124:147173; pp. 1-10.

*Primary Examiner* — Duc Truong
(74) *Attorney, Agent, or Firm* — Hultquist, PLLC; Steven J. Hultquist

(57) ABSTRACT

The present invention relates to a double metal cyanide (DMC) complex catalyst with an improved catalytic activity useful for epoxide polymerization. It also relates to polyether polyols prepared by a polymerization reaction using said DMC catalyst.

15 Claims, No Drawings

PROCESS FOR PREPARING HIGHLY ACTIVE DOUBLE METAL CYANIDE CATALYSTS AND THEIR USE IN THE SYNTHESIS OF POLYETHER POLYOLS

CROSS-REFERENCE TO RELATED APPLICATIONS

This application is a divisional application under 35 U.S.C. §120 of U.S. patent application Ser. No. 14/117,052 filed on Nov. 12, 2013 now U.S. Pat. No. 9,221,947, which in turn is a U.S. national phase under the provisions of 35 U.S.C. §371 of International Patent Application No. PCT/EP12/59081 filed May 16, 2012, which in turn claims priority of European Patent Application No. 11382156.5 filed May 17, 2011. The disclosures of U.S. patent application Ser. No. 14/117,052, International Patent Application No. PCT/EP12/59081, and European Patent Application No. 11382156.5 are hereby incorporated herein by reference in their respective entireties, for all purposes.

FIELD OF THE INVENTION

The present invention relates to a process for the preparation of double metal cyanide (DMC) complex catalysts with an improved catalytic activity useful for epoxide polymerization, as well as to a process for preparing polyether polyols using said catalysts. In particular, the DMC catalysts of the invention are easy to prepare, have a very high activity and provide polyol products having low unsaturations and low polidispersity.

BACKGROUND OF THE INVENTION

Double metal cyanide (DMC) complexes are well-known catalysts for epoxide polymerization. These catalysts are highly active and give polyether polyols having low unsaturation, a very narrow molecular weight distribution and consequently, a low polydispersity.

DMC catalysts were discovered more than forty years ago by researches from the General Tire and Rubber Company (U.S. Pat. No. 3,404,109; U.S. Pat. No. 3,427,256; U.S. Pat. No. 3,427,334 and U.S. Pat. No. 3,941,849). Since then, the technology for producing DMC catalysts has been improved by different companies.

Conventional process for the preparation of DMC catalysts directed to the epoxide polymerization is well-disclosed in EP0090444, EP0090445, EP1022300, EP0555053, EP0700949, EP0894108 and EP0932445. This process involves the reaction of aqueous solutions of metal salts and metal cyanide salts to form a precipitate of the DMC compound. A low molecular weight organic complexing agent, typically an ether or an alcohol such as tert-butyl alcohol, is included in the catalyst preparation. The activity of DMC catalysts has been greatly enhanced by incorporating, in addition to the organic complexing agent, functionalized ligands such as polyether polyols.

The resulting water-insoluble double metal cyanide complex catalyst which precipitates from solution must thereafter be recovered from the aqueous reaction medium, washed to remove undesirable by products and impurities, and dried in order to obtain the catalyst in a form suitable for use in a polymerization process.

To this aim, the solid complex is firstly reslurried in a mixture of an organic complexing agent, generally tert-butyl alcohol, and water and thereafter in pure organic complexing agent, being subsequently filtered and dried under vacuum at a moderate temperature.

Different modifications with respect to the order of addition of reactants or the time to incorporate the organic complexing agent have been published. For example, EP0555053 describes the addition of the aqueous solution of the metal salt over the aqueous solution of the metal cyanide salt, whereas in EP0743093 the reverse order of addition is disclosed, showing the advantageous effect on the activity of the resulting DMC catalyst.

However, there are few documents describing the effect of the washing step on the catalytic activity. EP0700949 shows that the washing step is necessary in order to give an active catalyst and that multiple washing steps could lead to the preparation of even more active catalysts. Said step is carried out by washing the precipitate with an aqueous solution of tert-butyl alcohol (70%).

Some references mention that an excessive use of water in the washing step should be avoided, since the excess of the non-reacting metal salt could be removed giving rise to a lower-active catalyst. In addition, in order to suit the drying of the catalyst, is desirable to wash it with the organic complexing agent only or with a mixture of water and organic complexing agent (EP0555053). In EP0894108, the catalyst is washed with an aqueous solution containing the organic complexing agent and a polyether polyol in a range 40-70% and 0.1-8%, respectively.

The isolation of the dry, active double metal cyanide complex catalyst is generally complicated and therefore, a convenient and effective method of preparing said catalysts which can be readily isolated by conventional and straightforward filtration techniques would be of particular interest.

On the other hand, it has been shown (EP0700949, EP0894108, EP0932445) that the incorporation of polyether polyols or functionalized polymers to the catalyst, in addition to the metal salt, the metal cyanide salt and the organic complexing agent, provides improved DMC catalysts with higher activities and allows the production of polyether polyols with low catalyst concentrations.

In EP0090444, the suspension of a DMC catalyst in a propoxilated glycerol with molecular weight ranged from 200 to 400 is described. In EP0700949 it is shown that the use of polyether polyol ligands with molecular weights higher than 500 provides DMC catalysts with an improved activity. EP0894108 discloses catalysts capable of polymerizing propylene oxide at a rate in excess of 1 Kg PO/g Co/min. at 100 ppm catalyst, based on the weight of finished polyether, at 105° C., said catalyst having polyethers with a number average molecular weight less than 500, and no tertiary hydroxyl groups. However, all of the examples of these documents describe the use of polyether polyols obtained by basic catalysis and the state of the art is silent about the influence of the acidic nature of the polyether polyol ligands.

DMC catalysts with improved properties are thus needed. In spite of the different procedures to provide DMC catalysts having good activity for epoxide polymerization, catalyst with even improved activity are still desirable in order to reduce the catalyst level used in said polymerization reactions.

Furthermore, since DMC catalysts generally require activation times higher than one hour which have a negatively impact on the polymerization cycle times, it is also desirable to reduce said activation times.

BRIEF DESCRIPTION OF THE INVENTION

The present invention provides a convenient and effective method of preparing double metal cyanide complex catalysts which can be rapidly isolated by conventional and straightforward techniques, with reduced activation times and exceptional catalytic activity.

In this sense, the authors of the present invention have surprisingly found that carrying out a first washing step of the precipitated solid obtained after the synthesis of the DMC compound, in an aqueous solution, without any organic complexing agent, leads to the formation of a DMC catalyst with a remarkable higher catalytic activity, which further requires substantially lower activation times.

In addition, the use of a polyether polyol obtained by acidic catalysis, as a ligand of the DMC catalyst, allows a further improvement on the activity of the catalyst in the process for the preparation of polyether polyols.

Therefore, a first aspect of the present invention refers to a process (from now onwards process 1) of preparing a double metal cyanide (DMC) complex catalyst, said process comprising:
a) synthesizing a solid double metal cyanide catalyst in the presence of an organic complexing agent and a polyether polyol ligand;
b) first washing the catalyst obtained in step a) with an aqueous solution comprising:
90-100% by weight of water; and
0-10% by weight of a polyether polyol ligand,
to form a slurry, wherein the aqueous solution does not contain any organic complexing agent.

Preferably, the process further comprises:
c) isolating the catalyst from the slurry obtained in step b); and
d) washing the solid catalyst obtained in step c) with a solution comprising:
90-100% by weight of an organic complexing agent, and
0-10% by weight of a polyether polyol ligand.

Surprisingly, a synergistic effect on the activity of the catalyst has been found when combining the use of the particular aqueous solution in the above mentioned washing step (step b) of the process 1 of the invention) with:
the use of an excess amount of an organic complexing agent in a subsequent washing step (step d) of the process 1 of the invention)
and/or
the use of an excess amount of an organic complexing agent in the synthesis of the DMC catalyst (step a) of the process 1 of the invention).

In a second aspect, the invention refers to a DMC catalyst obtainable by the process 1 as defined above.

Additionally, a third aspect of the invention refers to a DMC catalyst as defined above which comprises:
at least one double metal cyanide;
at least one organic complexing agent; and
at least one polyether polyol ligand having a molecular weight lower than 2000, which has been obtained by acidic catalysis.

The fourth aspect of the present invention relates to a process (from now onwards process 2) for polymerizing an epoxide, said process comprising the reaction of an epoxide with an initiator in the presence of a DMC catalyst as defined above.

A further synergistic effect on the activity of the DMC catalyst in the polymerization of epoxides can be obtained when the catalyst contains, as a ligand, a polyether polyol synthesized by acidic catalysis, and the same polyether polyol is used as initiator of the polymerization reaction.

Finally, the invention also refers to a polyether polyol obtainable by the process 2 as defined above.

DETAILED DESCRIPTION OF THE INVENTION

The process 1 of the invention provides a DMC catalyst with a remarkable higher catalytic activity useful for epoxide polymerization, which further requires substantially lower activation times as pointed out in example 8 (table I). Due to its improved activity, it can be used at very low concentrations, such as 30 ppm or less. At such low catalyst levels, the catalyst can often be left in the polymer product without an adverse impact on the product quality thus, effectively avoiding the need for a catalyst removal step. However, if a polymer product with a very high purity is required, the catalyst can be readily removed by filtration, for example following the procedure described in EP1338618B1. According to a preferred embodiment, the catalyst is removed to concentrations below 10 ppm or below 5 ppm.

Furthermore, the DMC catalyst obtained following the process 1 of the invention provides polyether polyols with lower unsaturation levels and lower polidispersity as shown in example 8 (table III).

Accordingly, the invention provides a process (process 1) for preparing DMC catalysts with higher activities useful for epoxide polymerization.

In a first step, the process comprises the synthesis of a solid double metal cyanide catalyst. This step is generally performed by reacting, in an aqueous solution, a water-soluble metal salt (in excess) and a water-soluble metal cyanide salt in the presence of a polyether polyol ligand and an organic complexing agent.

In a preferred embodiment of the process of the invention, aqueous solutions of a water-soluble metal salt and a water-soluble metal cyanide salt are first reacted in the presence of the organic complexing agent using efficient mixing to produce a catalyst slurry. The metal salt is used in excess. The catalyst slurry contains the reaction product of the metal salt and the metal cyanide salt, which is a double metal cyanide compound. Also present are excess metal salt, water, and organic complexing agent, each is incorporated to some extent in the catalyst structure. In another preferred embodiment, the mixture of the aqueous solution containing the water-soluble metal salt and the aqueous solution containing the water-soluble metal cyanide salt takes place at a temperature ranging from 30 to 70° C., more preferably from 40 to 60° C., even more preferably at about 50° C.

The water-soluble metal salt preferably has the general formula $MA_n$ wherein:
M is a cation selected form the group consisting of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Preferably, M is a cation selected from Zn(II), Fe(II), Ni(II), Mn(II) and Co(II);
A is an anion selected from the group consisting of halide, hydroxide, sulfate, carbonate, vanadate, cyanide, oxalate, thiocyanate, isocyanate, isothiocyanate, carboxylate and nitrate. Preferably, A is a cation selected from halide;
n is 1, 2 or 3 and satisfies the valency state of M.

Examples of suitable metal salts include, but are not limited to, zinc chloride, zinc bromide, zinc acetate, zinc acetonylacetonate, zinc benzoate, zinc nitrate, iron(II) sulfate, iron(II) bromide, cobalt(II) chloride, cobalt(II) thiocyanate, nickel(II) formate, nickel(II) nitrate and the like and mixtures thereof.

The water-soluble metal cyanide salts preferably have the formula $D_x[E_y(CN)_6]$, wherein:

D is an alkali metal ion or alkaline earth metal ion;

E is a cation selected from the group consisting of Co(II), Co(III), Fe(II), Fe(III), Mn(II), Mn(III), Cr(II), Cr(III), Ni(II), Ir(III), Rh(III), Ru(II), V(IV) and V(V). Preferably, E is selected from Co(II), Fe(II), Ni(II), Co(III) and Fe(III);

x and y are integers greater than or equal to 1, the sum of the charges of x and y balances the charge of the cyanide (CN) group.

Suitable water-soluble metal cyanide salts include, but are not limited to, potassium hexacyanocobaltate (III), potassium hexacyanoferrate (II), potassium hexacyanoferrate (III), calcium hexacyanocobaltate (III), lithium hexacyanocobaltate (III), and the like.

The organic complexing agent can be included with either or both of the aqueous salt solutions, or it can be added to the catalyst slurry immediately following precipitation of the DMC compound. It is generally preferred to pre-mix the organic complexing agent with either aqueous solution before combining the reactants. Usually, an excess amount of the complexing agent is used.

Generally, the complexing agent must be relatively soluble in water. Suitable organic complexing agents are those commonly known in the art, for example in U.S. Pat. No. 5,158,922. Preferred organic complexing agents are water-soluble heteroatom-containing organic compounds that can complex with the double metal cyanide compound. More preferably, the organic complexing agents are water-soluble heteroatom-containing compounds selected from monoalcohols, aldehydes, ketones, ethers, esters, amides, ureas, nitriles, sulfides and mixtures thereof. Preferred organic complexing agents are water-soluble aliphatic alcohols selected from the group consisting of ethanol, isopropyl alcohol, n-butyl alcohol, iso-butyl alcohol, sec-butyl alcohol and tert-butyl alcohol. Tert-butyl alcohol (TBA) is particularly preferred.

The aqueous metal salt and metal cyanide salt solutions (or their DMC reaction product) need to be mixed efficiently with the organic complexing agent to produce the most active form of the catalyst. A stirrer can be conveniently used to achieve efficient mixing.

Examples of double metal cyanide compounds resulting from this reaction include, for example, zinc hexacyanocobaltate (III), zinc hexacyanoferrate (III), nickel hexacyanoferrate (II), cobalt hexacyanocobaltate (III) and the like. Zinc hexacyanocobaltate (III) is preferred.

The catalyst slurry produced after the mixing of the aqueous solutions in the presence of the organic complexing agent is then combined with a polyether polyol ligand. This step is preferably performed using a stirrer so that an efficient mixture of the catalyst slurry and the polyether polyol takes place.

This mixture is preferably performed at a temperature ranging from 30 to 70° C., more preferably from 40 to 60° C., even more preferably at about 50° C.

Suitable polyethers include those produced by ring-opening polymerization of cyclic ethers, and include epoxide polymers, oxetane polymers, tetrahydrofuran polymers and the like. Any method of catalysis can be used to make the polyethers. The polyethers can have any desired end groups, including, for example, hydroxyl, amine, ester, ether or the like. Preferred polyethers are polyether polyols having average hydroxyl functionalities from about 2 to about 8. Also preferred are polyether polyols having a number average molecular weight lower than 2000, more preferably between 200 and 1000, even more preferably between 300 and 800. These are usually made by polymerizing epoxides in the presence of active hydrogen-containing initiators and basic, acidic or organometallic catalysts (including DMC catalysts).

Useful polyether polyols include poly(oxypropylene) polyols, ethylene oxide-capped poly(oxypropylene) polyols, mixed ethylene oxide-propylene oxide polyols, butylenes oxide polymers, butylenes oxide copolymers with ethylene oxide and/or propylene oxide, polytetra methylene ether glycols and the like. Most preferred are poly(oxypropylene) polyols, particularly diols and triols having number average molecular weights lower than 2000, more preferably between 200 and 1000, even more preferably between 300 and 800.

More preferably, the polyether polyol used in the process 1 of the invention has been synthesized by acidic catalysis, i.e. by polymerizing an epoxide in the presence of active hydrogen-containing initiator and acidic catalysts. Examples of suitable acidic catalysts include Lewis acids such as $BF_3$, $SbF_5$, $Y(CF_3SO_3)_3$, or Brönstedt acids such as $CF_3SO_3H$, $HBF_4$, $HPF_6$, $HSbF_6$.

Using a polyether obtained by acidic catalysis in the process 1 of the present invention, in addition to the organic complexing agent, surprisingly enhances the catalyst activity compared with the activity of a similar catalyst prepared in the presence of a polyether obtained by basic or organometallic catalysis.

Once the polyether has been combined with the double metal cyanide compound, a polyether-containing solid catalyst is isolated from the catalyst slurry. This is accomplished by any convenient means, such as filtration, centrifugation or the like.

In a particular embodiment, enough reactants are used to give a solid DMC catalyst that contains:
- 30-80% by weight of the double metal cyanide compound;
- 1-10% by weight of water;
- 1-30% by weight of the organic complexing agent; and
- 1-30% by weight of the polyether polyol ligand.

Preferably, the total amount of the organic complexing agent and the polyether polyol is from 5% to 60% by weight with respect to the total weight of the catalyst, more preferably from 10% to 50% by weight, even more preferably from 15% to 40% by weight.

The isolated polyether-containing solid catalyst is then first washed with an aqueous solution comprising 90-100% by weight of water and 0-10% by weight of a polyether polyol. This aqueous solution is absent of any organic complexing agent as those mentioned above. The washing step is used to remove impurities from the catalyst that will render a less active catalyst if they are not removed.

It should be pointed out that no other washing step can be performed before this first washing step mentioned above once the isolated polyether-containing solid catalyst has been obtained in step a) of the process 1 of the invention.

It has been surprisingly found that the particular composition of the aqueous solution used in this washing step leads to a double metal cyanide catalyst with an enhanced activity. As shown in the examples of the present invention, this activity is higher when compared to that obtained for a catalyst having been obtained using a process that includes a washing step using an aqueous solution comprising an organic complexing agent and a polyether polyol.

Preferably, the amount of polyether polyol ligand in the aqueous solution in step b) is lower than 5% with respect to the total weight of solution. According to a further particular embodiment the amount of polyether polyol ligand in the aqueous solution in step b) is lower than 4% with respect to the total weight of solution, preferably lower 3%. According to a further embodiment, the amount of polyether polyol ligand in the aqueous solution in step b) is between 0.1% and 2% with respect to the total weight of solution, preferably between 0.3% and 1.8%. In a further particular embodiment, the amount of polyether polyol ligand in the aqueous solution in step b) is 0%. The use of water in this washing step without any content of polyether polyol ligand presumably leads to a double metal cyanide catalyst with an even higher activity.

The washing step is generally accomplished by reslurrying the catalyst in the aqueous solution followed by a catalyst isolation step using any convenient means, such as filtration.

It has also been surprisingly found that the use of this particular aqueous solution in the washing step b) in combination with an excess amount of the organic complexing agent in the step a) and/or d), provides a synergistic effect on the activity of the DMC catalyst as shown in example 8 of the present invention.

Furthermore, the use of the particular aqueous solution in the washing step also allows reducing the filtration times, which involves a significant reduction of costs in an industrial scale process. Experimental tests at industrial scale have shown that filtration is completed in less than 3 hours in comparison to the at least 12 hours required in other processes of the state of the art.

Although a single washing step suffices to give a catalyst with enhanced activity, it is preferred to wash the catalyst more than once. In a preferred embodiment of the process 1 of the invention, the subsequent wash is non-aqueous and includes the reslurry of the double metal cyanide catalyst in an organic complexing agent or in a mixture of the organic complexing agent and the polyether polyol used in the previous washing step. More preferably, the double metal cyanide catalyst is washed with a solution comprising 90-100% by weight of the organic complexing agent and 0-10% by weight of the polyether polyol. The organic complexing agent is preferably tert-butyl alcohol.

After the catalyst has been washed, it is usually preferred to dry it under vacuum until the catalyst reaches a constant weight. The catalyst can be dried at temperatures within the range of about 50° C. to 120° C., more preferably from 60° C. to 110° C., even more preferably from 90° C. to 110° C. Contrary to the state of the art (see for example EP0555053) wherein temperatures ranging from 15° C. to 40° C. are required in order not to deactivate the catalyst, the process 1 of the invention allows an effective drying step at higher temperatures without affecting the structure of the catalyst, and thus requiring less time.

The dry catalyst can be crushed to yield a highly active catalyst in powder form appropriate for use in a ring-opening polymerization reaction.

The process 1 of the invention provides double metal cyanide complex catalysts with reduced activation times and exceptional catalytic activity. In particular, the first washing step of the precipitated solid obtained after the synthesis of the DMC catalyst, in an aqueous solution, without any organic complexing agent, leads to the formation of a DMC catalyst with a remarkable higher catalytic activity than that for DMC catalysts subjected to a first washing step using a solution containing organic complexing agents.

This washing step, combined with the use in the reaction process leading to the double metal cyanide catalyst of a polyether polyol, obtained by acidic catalysis, allows obtaining a higher improvement on the activity of the catalyst in the process for the preparation of polyether polyols.

In view of the improved activity of this catalyst when compared to other DMC catalyst obtained following conventional methods, the process 1 defined above would necessarily leads to the preparation of a catalyst with a particular structure that confers this enhanced activity.

Therefore, in a second aspect the invention also refers to a double metal cyanide catalyst obtainable by the process 1 as define above.

In a particular embodiment, the catalyst obtainable by the process of claim 1 is also characterized by comprising:
at least one double metal cyanide compound;
at least one organic complexing agent; and
at least one polyether polyol ligand having a molecular weight lower than 2000.

Preferably the double metal cyanide compound is selected from zinc hexacyanocobaltate (III), zinc hexacyanoferrate (III), nickel hexacyanoferrate (II), cobalt hexacyanocobaltate (III) and the like. Zinc hexacyanocobaltate (III) is preferred.

Also preferably, organic complexing agents are water-soluble heteroatom-containing organic compounds that can complex with the double metal cyanide compound. Preferred organic complexing agents are water-soluble aliphatic alcohols selected from the group consisting of ethanol, isopropyl alcohol, n-butyl alcohol, iso-butyl alcohol, sec-butyl alcohol and tert-butyl alcohol. Tert-butyl alcohol (TBA) is particularly preferred.

Polyether polyol ligands include generally those produced by ring-opening polymerization of cyclic ethers, and include epoxide polymers, oxetane polymers, tetrahydrofuran polymers and the like. Preferred polyethers are polyether polyols having a number average molecular weight between 200 and 1000, more preferably between 300 and 800.

Most preferred are poly(oxypropylene) polyols, particularly diols and triols having number average molecular weights between 200 and 1000, more preferably between 300 and 800.

More preferably, the polyether polyol has been synthesized by acidic catalysis, i.e. by polymerizing an epoxide in the presence of active hydrogen-containing initiator and acidic catalysts. Examples of suitable acidic catalysts include Lewis acids such as $BF_3$, $SbF_5$, $Y(CF_3SO_3)_3$, or Brönstedt acids such as $CF_3SO_3H$, $HBF_4$, $HPF_6$, $HSbF_6$.

In a particular embodiment, the double metal cyanide catalyst obtainable by process 1 of the invention comprises:
30-80% by weight of the double metal cyanide compound;
1-10% by weight of water;
1-30% by weight of the organic complexing agent; and
1-30% by weight of the polyether polyol ligand.

Preferably, the total amount of the organic complexing agent and the polyether polyol is from 5% to 60% by weight with respect to the total weight of the catalyst, more preferably from 10% to 50% by weight, even more preferably from 15% to 40% by weight.

It has been surprisingly found that DMC catalysts with a polyether polyol ligand obtained by acidic catalysis in their composition, which have been obtained according to the process 1 of the invention using the particular washing composition, have a catalytic activity markedly higher than DMC catalysts of the state of the art, as well as a reduced activation time.

The catalyst of the invention may be used in any of the polymerization reactions known in the art wherein double metal cyanide complex catalysts have been employed. More particularly, the catalyst is used in a process for making an epoxide polymer.

Therefore, the invention refers to a process (process 2) for polymerizing an epoxide, said process comprising the reaction of an epoxide with an initiator in the presence of a DMC catalyst as defined above.

Preferred epoxides are ethylene oxide, propylene oxide, butane oxide, styrene oxide and the like, and mixtures thereof. The process can be used to make random or block copolymers. The epoxide polymer can be, for example, a polyether polyol derived from the polymerization of an epoxide in the presence of a hydroxyl group-containing initiator.

Other monomers that will copolymerize with an epoxide in the presence of the DMC catalyst can be included in the process 2 of the invention to make other types of epoxide polymers. Any of the copolymers known in the art made using conventional DMC catalysts can be made with the catalysts of the invention. For example, epoxides copolymerize with oxetanes to give polyethers, or with anhydrides to give polyester or polyetherester polyols.

Preferably, the polyether polyol used as a ligand of the DMC catalyst is a polyether polyol having been synthesized by acidic catalysis. Also preferably, the initiator of the polymerization reaction has been obtained by acidic catalysis, being more preferably the use of a polyether polyol such as the one used as a ligand of the catalyst.

The acidic nature of the ligand and the initiator improves the catalytic activity of the DMC catalyst since a further synergistic effect in the activity of the catalyst has been observed in epoxide polymerization reactions when an acidic polyether polyol is used as a ligand of the catalyst and as initiator of the polymerization reaction.

In a preferred embodiment of the invention, the polymerization reaction in the presence of the catalyst of the invention takes place at a temperature higher than 110° C., more preferably from 120° C. to 160° C.

The use of the DMC catalyst of the invention in the epoxide polymerization reaction allows the preparation of polyether polyols with lower unsaturation and lower polydispersity as pointed out in example 8 (table III). This is particularly advantageous since a low polydispersity provides polyether polyols with a lower viscosity, a property which is highly desirable for the subsequent applications of this type of polymers. Therefore, this polymerization process (process 2) leads to the preparation of polyether polyols with improved properties.

Consequently, the invention also refers to a polyether polyol obtainable by the process 2 as defined above.

The following examples merely illustrate the invention. Those skilled in the art will recognize many variations that are within the spirit of the invention and scope of the claims.

EXAMPLES

General Remarks

In the following examples, the terms "A" and "B" following the type of polyol means that the polyol has been synthesized by acidic catalysis and basic catalysis, respectively.

Example 1

Preparation of Zinc Hexacyanocobaltate Catalyst Using TBA as Organic Complexing Agent and Polypropylene Glycol (PPG) B (MWn 400) as Polyol $1^{st}$ Step Potassium hexacyanocobaltate (7.5 g) is dissolved in deionized water (100 ml) in a beaker (Solution A). Zinc chloride (75 g) and tert-butyl alcohol TBA (50 mL) are dissolved in deionized water (275 mL) in a second beaker (Solution B).

Solution B is heated at a temperature of 50° C. Subsequently, solution A is slowly added for 30 minutes to the solution B while stirring at 400 rpm. The aqueous zinc chloride and TBA solution and the cobalt salt solution are combined using a stirrer to intimately and efficiently mix both aqueous solutions. The mixture is held post-reacting for 30 minutes at the same temperature to form a slurry of zinc hexacyanocobaltate.

A third solution (solution C) is prepared by dissolving a 400 mol. wt diol (8 g, polypropylene glycol (PPG)) in deionized water (50 mL) and TBA (2 mL). Said diol has been synthesized by basic catalysis following procedures widely known in the art.

Solution C (the PPG/water/TBA mixture) is added to the aqueous slurry zinc hexacyanocobaltate for 5 minutes, and the product is stirred for 10 additional minutes. The mixture is filtered under pressure to isolate the solid.

$2^{nd}$ Step

The solid cake is reslurried in water (150 mL) for 30 minutes at a temperature of 50° C. and subsequently, additional 400 mol. wt diol PPG (2 g) is added. The mixture is homogenized by stirring for 10 minutes and filtered.

$3^{rd}$ Step

The solid cake obtained after the second step is reslurried in TBA (185 mL) for 30 minutes at a temperature of 50° C. and subsequently, additional 400 mol. wt diol PPG (1 g) is added. The mixture is homogenized by stirring for 5 minutes and filtered.

The resulting solid catalyst (catalyst 1) is dried under vacuum at 100° C. and 10 mbar to constant weight.

Example 2

Preparation of Zinc Hexacyanocobaltate Catalyst Using TBA as Organic Complexing Agent at a 50% Higher Proportion than in Example 1, and Polypropylene Glycol (PPG) B (MWn 400) as Polyol $1^{st}$ Step Potassium hexacyanocobaltate (7.5 g) is dissolved in deionized water (100 ml) in a beaker (Solution A). Zinc chloride (75 g) and tert-butyl alcohol TBA (75 mL) are dissolved in deionized water (275 mL) in a second beaker (Solution B).

Solution B is heated at a temperature of 50° C. Subsequently, solution A is slowly added for 30 minutes to the solution B while stirring at 400 rpm. The aqueous zinc chloride and TBA solution and the cobalt salt solution are combined using a stirrer to intimately and efficiently mix both aqueous solutions. The mixture is held post-reacting for 30 minutes at the same temperature to form a slurry of zinc hexacyanocobaltate.

A third solution (solution C) is prepared by dissolving a 400 mol. wt diol (8 g, polypropylene glycol (PPG)) in deionized water (50 mL) and TBA (3 mL). Said diol has been synthesized by basic catalysis following procedures widely known in the art.

Solution C (the PPG/water/TBA mixture) is added to the aqueous slurry zinc hexacyanocobaltate for 5 minutes, and the product is stirred for 10 additional minutes. The mixture is filtered under pressure to isolate the solid.

2$^{nd}$ Step

The solid cake is reslurried in water (208 mL) for 30 minutes at a temperature of 50° C. and subsequently, additional 400 mol. wt diol PPG (2 g) is added. The mixture is homogenized by stirring for 10 minutes and filtered.

3$^{rd}$ Step

The solid cake obtained after the second step is reslurried in TBA (280 mL) for 30 minutes at a temperature of 50° C. and subsequently, additional 400 mol. wt diol PPG (1 g) is added. The mixture is homogenized by stirring for 5 minutes and filtered.

The resulting solid catalyst (catalyst 2) is dried under vacuum at 100° C. and 10 mbar to constant weight.

Example 3

Preparation of Zinc Hexacyanocobaltate Catalyst Using TBA as Organic Complexing Agent (at a 50% Higher Proportion than in Example 1, or as Example 2) and Propoxylated Glycerol A (MWn 700) as Polyol 1$^{st}$ Step Potassium hexacyanocobaltate (7.5 g) is dissolved in deionized water (100 ml) in a beaker (Solution A). Zinc chloride (75 g) and tert-butyl alcohol TBA (75 mL) are dissolved in deonized water (275 mL) in a second beaker (Solution B).

Solution B is heated at a temperature of 50° C. Subsequently, solution A is slowly added for 30 minutes to the solution B while stirring at 400 rpm. The aqueous zinc chloride and TBA solution and the cobalt salt solution are combined using a stirrer to intimately and effectively mix both aqueous solutions. The mixture is held post-reacting for 30 minutes at the same temperature to form a slurry of zinc hexacyanocobaltate.

A third solution (solution C) is prepared by dissolving a 700 mol. wt. triol (14 g, a propoxylated glycerol) in deonized water (50 mL) and TBA (3 mL). Said triol has been synthesized by acidic catalysis following procedures widely known in the art.

Solution C (the propoxylated glycerol/water/TBA mixture) is added to the aqueous slurry zinc hexacyanocobaltate for 5 minutes, and the product is stirred for 10 additional minutes. The mixture is filtered under pressure to isolate the solid.

2$^{nd}$ Step

The solid cake is reslurried in water (208 mL) for 30 minutes at a temperature of 50° C. and subsequently, additional 700 mol. wt triol (propoxylated glycerol) (3.5 g) is added. The mixture is homogenized by stirring for 10 minutes and filtered.

3$^{rd}$ Step

The solid cake obtained after the second step is reslurried in TBA (280 mL) for 30 minutes at a temperature of 50° C. and subsequently, additional 700 mol. wt triol (propoxylated glycerol) (1.75 g) is added. The mixture is homogenized by stirring for 5 minutes and filtered.

The resulting solid catalyst (catalyst 3) is dried under vacuum at 100° C. and 10 mbar to constant weight.

Comparative Example 4

Preparation of Zinc Hexacyanocobaltate Catalyst Using TBA as Organic Complexing Agent and Polypropylene Glycol (PPG) B (MW 400) as Polyol. Second Step 70% TBA/H$_2$O 1$^{st}$ Step Potassium hexacyanocobaltate (7.5 g) is dissolved in deionized water (100 ml) in a beaker (Solution A). Zinc chloride (75 g) and tert-butyl alcohol TBA (50 mL) are dissolved in deonized water (275 mL) in a second beaker (Solution B).

Solution B is heated at a temperature of 50° C. Subsequently, solution A is slowly added for 30 minutes to the solution B while stirring at 400 rpm. The aqueous zinc chloride and TBA solution and the cobalt salt solution are combined using a stirrer to intimately and efficiently mix both aqueous solutions. The mixture is held post-reacting for 30 minutes at the same temperature to form a slurry of zinc hexacyanocobaltate.

A third solution (solution C) is prepared by dissolving a 400 mol. wt. diol (8 g, polypropylene glycol (PPG)) in deonized water (50 mL) and TBA (2 mL). Said diol has been synthesized by basic catalysis following procedures widely known in the art.

Solution C (the PPG/water/TBA mixture) is added to the aqueous slurry zinc hexacyanocobaltate for 5 minutes, and the product is stirred for 10 additional minutes. The mixture is filtered under pressure to isolate the solid.

2$^{nd}$ Step

The solid cake is reslurried in an aqueous solution (185 mL) containing TBA (70%) for 30 minutes at a temperature of 50° C. and subsequently, additional 400 mol. wt diol PPG (2 g) is added. The mixture is homogenized by stirring for 10 minutes and filtered.

3$^{rd}$ Step

The solid cake obtained after the second step is reslurried in TBA (185 mL) for 30 minutes at a temperature of 50° C. and subsequently, additional 400 mol. wt diol PPG (1 g) is added. The mixture is homogenized by stirring for 5 minutes and filtered.

The resulting solid catalyst (comparative catalyst 4) is dried under vacuum at 100° C. and 10 mbar to constant weight.

Comparative Example 5

Preparation of Zinc Hexacyanocobaltate Catalyst Using TBA as Organic Complexing Agent and Polypropylene Glycol (PPG) B (MW 400) as Polyol. Second Step 50% TBA/H$_2$O 1$^{st}$ Step Potassium hexacyanocobaltate (7.5 g) is dissolved in deionized water (100 ml) in a beaker (Solution A). Zinc chloride (75 g) and tert-butyl alcohol TBA (50 mL) are dissolved in deonized water (275 mL) in a second beaker (Solution B).

Solution B is heated at a temperature of 50° C. Subsequently, solution A is slowly added for 30 minutes to the solution B while stirring at 400 rpm. The aqueous zinc chloride and TBA solution and the cobalt salt solution are combined using a stirrer to intimately and efficiently mix both aqueous solutions. The mixture is held post-reacting for 30 minutes at the same temperature to form a slurry of zinc hexacyanocobaltate.

A third solution (solution C) is prepared by dissolving a 400 mol. wt. diol (8 g, polypropylene glycol (PPG)) in deonized water (50 mL) and TBA (2 mL). Said diol has been synthesized by basic catalysis following procedures widely known in the art.

Solution C (the PPG/water/TBA mixture) is added to the aqueous slurry zinc hexacyanocobaltate for 5 minutes, and the product is stirred for 10 additional minutes. The mixture is filtered under pressure to isolate the solid.

2$^{nd}$ Step

The solid cake is reslurried in an aqueous solution (185 mL) containing TBA (50%) for 30 minutes at a temperature of 50° C. and subsequently, additional 400 mol. wt diol PPG (2 g) is added. The mixture is homogenized by stirring for 10 minutes and filtered.

3$^{rd}$ Step

The solid cake obtained after the second step is reslurried in TBA (185 mL) for 30 minutes at a temperature of 50° C. and subsequently, additional 400 mol. wt diol PPG (1 g) is added. The mixture is homogenized by stirring for 5 minutes and filtered.

The resulting solid catalyst (comparative catalyst 5) is dried under vacuum at 100° C. and 10 mbar to constant weight.

Comparative Example 6

Preparation of Zinc Hexacyanocobaltate Catalyst Using TBA as Organic Complexing Agent and Polypropylene Glycol (PPG) B (MW 400) as Polyol. Second Step 100% TBA 1$^{st}$ Step Potassium hexacyanocobaltate (7.5 g) is dissolved in deionized water (100 ml) in a beaker (Solution A). Zinc chloride (75 g) and tert-butyl alcohol TBA (50 mL) are dissolved in deonized water (275 mL) in a second beaker (Solution B).

Solution B is heated at a temperature of 50° C. Subsequently, solution A is slowly added for 30 minutes to the solution B while stirring at 400 rpm. The aqueous zinc chloride and TBA solution and the cobalt salt solution are combined using a stirrer to intimately and efficiently mix both aqueous solutions. The mixture is held post-reacting for 30 minutes at the same temperature to form a slurry of zinc hexacyanocobaltate.

A third solution (solution C) is prepared by dissolving a 400 mol. wt. diol (8 g, polypropylene glycol (PPG)) in deonized water (50 mL) and TBA (2 mL). Said diol has been synthesized by basic catalysis following procedures widely known in the art.

Solution C (the PPG/water/TBA mixture) is added to the aqueous slurry zinc hexacyanocobaltate for 5 minutes, and the product is stirred for 10 additional minutes. The mixture is filtered under pressure to isolate the solid.

2$^{nd}$ Step

The solid cake is reslurried in TBA (185 mL) for 30 minutes at a temperature of 50° C. and subsequently, additional 400 mol. wt diol PPG (2 g) is added. The mixture is homogenized by stirring for 10 minutes and filtered.

3$^{rd}$ Step

The solid cake obtained after the second step is reslurried in TBA (185 mL) for 30 minutes at a temperature of 50° C. and subsequently, additional 400 mol. wt diol PPG (1 g) is added. The mixture is homogenized by stirring for 5 minutes and filtered.

The resulting solid catalyst (comparative catalyst 6) is dried under vacuum at 100° C. and 10 mbar to constant weight.

Comparative Example 7

Preparation of Zinc Hexacyanocobaltate Catalyst Using TBA as Organic Complexing Agent at 50% Higher Proportion than in Example 4, and Polypropylene Glycol (PPG) B (MW 400) as Polyol. Second Step 78% TBA/H$_2$O 1$^{st}$ Step Potassium hexacyanocobaltate (7.5 g) is dissolved in deionized water (100 ml) in a beaker (Solution A). Zinc chloride (75 g) and tert-butyl alcohol TBA (75 mL) are dissolved in deonized water (275 mL) in a second beaker (Solution B).

Solution B is heated at a temperature of 50° C. Subsequently, solution A is slowly added for 30 minutes to the solution B while stirring at 400 rpm. The aqueous zinc chloride and TBA solution and the cobalt salt solution are combined using a stirrer to intimately and efficiently mix both aqueous solutions. The mixture is held post-reacting for 30 minutes at the same temperature to form a slurry of zinc hexacyanocobaltate.

A third solution (solution C) is prepared by dissolving a 400 mol. wt. diol (8 g, polypropylene glycol (PPG)) in deonized water (50 mL) and TBA (3 mL). Said diol has been synthesized by basic catalysis following procedures widely known in the art.

Solution C (the PPG/water/TBA mixture) is added to the aqueous slurry zinc hexacyanocobaltate for 5 minutes, and the product is stirred for 10 additional minutes. The mixture is filtered under pressure to isolate the solid.

2$^{nd}$ Step

The solid cake is reslurried in a solution containing 195 mL of TBA and 55 mL of water for 30 minutes at a temperature of 50° C. and subsequently, additional 400 mol. wt diol PPG (2 g) is added. The mixture is homogenized by stirring for 10 minutes and filtered.

3$^{rd}$ Step

The solid cake obtained after the second step is reslurried in TBA (280 mL) for 30 minutes at a temperature of 50° C.

and subsequently, additional 400 mol. wt diol PPG (1 g) is added. The mixture is homogenized by stirring for 5 minutes and filtered.

The resulting solid catalyst (comparative catalyst 7) is dried under vacuum at 100° C. and 10 mbar to constant weight.

Example 8

Measurement of Catalyst Activity in the Synthesis of Polyols Using an Acidic Initiator The catalysts prepared following examples 1-3 and comparative examples 4-7 were tested in the copolymerization reaction of propylene oxide (PO) and ethylene oxide (EO).

The procedure was the following:

A two-liter Büchi reactor was charged with 200 g of a 700 mol. wt. polyether polyol triol (polymerization initiator) previously synthesized by acidic catalysis. The compound was stirred at 1000 rpm and heated at a temperature of 140° C. under inert atmosphere. In order to remove the humidity from the polyether polyol, vacuum was applied sparging with $N_2$ during the required time to reach a humidity lower than 100 ppm. Subsequently, DMC catalyst (30 ppm) was added while stirring under vacuum for 10 minutes without sparging $N_2$.

Propylene oxide (30 g) was added to the reactor for the catalyst activation. An accelerated drop in reactor pressure soon occurred, indicating that the catalyst had become activated.

After initiation of the catalyst was verified, a mixture of propylene oxide/ethylene oxide was slowly added to the reactor until the desired molecular weight was reached. The addition of propylene oxide was carried out at 140° C. maintaining the reactor pressure below 1.5 kg/cm².

Catalyst activity is measured from the slope of a PO/EO conversion vs. time plot.

Once the mixture of propylene oxide/ethylene oxide was completely added, the reaction mixture was held post-reacting for one hour in order to complete the conversion of monomers. Finally, residual monomers were removed under vacuum sparging with $N_2$ for one additional hour. The resulting polymer is a poly(oxyethylene propylene) triol having average number molecular weight 3500.

Table I shows the activity of the catalysts 1-3 and comparative catalysts 4-6 and their activation times.

TABLE I

Activity of the catalysts 1-3 and comparative catalysts 4-6 measured following the process as described above.

|  | Activation time (min) | Catalyst activity (g/min) | Improvement percentage with respect to comparative catalyst 4 |
| --- | --- | --- | --- |
| Catalyst 1 | 22 | 18.2 | 21% |
| Catalyst 2 | 21 | 31 | 107% |
| Catalyst 3 | 9 | 35.7 | 138% |
| Comparative Catalyst 4 | 32 | 15 |  |
| Comparative Catalyst 5 | 33 | 11.6 | −23% |
| Comparative Catalyst 6 | 30 | 12 | −20% |

As shown in table I, the catalysts obtained following the process of the invention (catalysts 1-3) are markedly more active than conventional catalyst of the state of the art and also show lower activation times.

In particular, the use of an aqueous solution lacking of organic complexing agent for washing the catalyst in the second step (example 1, catalyst 1) confers the catalyst with a 21% activity improvement with respect to a catalyst obtained by conventional processes of the art (example 4, comparative catalyst 4) which use a washing aqueous solution containing TBA. Second step using mixtures of TBA/$H_2O$ lead to less active catalyst.

Furthermore, the combined use of an aqueous solution lacking organic complexing agent in the step 2 of the process (step b) of the process 1 of the invention), with an increased amount of organic complexing agent in steps 1 and 3 (steps a) and d), respectively, of the process 1 of the invention) (example 2, catalyst 2) leads to a synergistic effect on the catalyst activity. An improvement of 107% on the catalyst activity is obtained.

It can also be observed that the polyol plays an important role in the catalyst activity. If a polyol synthesized by acidic catalysis is used, its activity can be evenly more improved (138%).

In order to confirm the improved properties of a catalyst obtained following the process 1 of the invention, the results of comparative catalyst 7 (obtained by a process which uses TBA in step 2) and catalyst 2 of the invention, both having been obtained using a 50% higher proportion of TBA in steps 1 and 3, were also compared.

The results are shown in table II below:

TABLE II

Activity of the catalyst 2 and comparative catalyst 7 measured following the process as described above.

|  | Activation time (min) | Catalyst activity (g/min) | Improvement percentage with respect to comparative catalyst 4 |
| --- | --- | --- | --- |
| Catalyst 2 | 21 | 31 | 107% |
| Comparative Catalyst 7 | 24 | 19.5 | 30% |

As can be seen, a markedly improvement in the catalyst activity of the catalyst of the invention is obtained, which again demonstrates the unexpected effect conferred by the use of an aqueous solution lacking of organic complexing agent for washing the catalyst in the second step (step b) of the process of the invention).

On the other hand, Table III shows the properties (unsaturation level and polydispersity) of the polymers synthesized using catalysts 1-3 and comparative catalysts 4-7.

TABLE III

Polyol properties with different catalysts

|  | Unsaturation | Polydispersity |
| --- | --- | --- |
| Catalyst 1 | 0.0071 | 1.17 |
| Catalyst 2 | 0.0064 | 1.14 |
| Catalyst 3 | 0.0069 | 1.15 |
| Comparative Catalyst 4 | 0.0083 | 1.22 |
| Comparative Catalyst 5 | 0.0091 | 1.25 |
| Comparative Catalyst 6 | 0.0088 | 1.23 |
| Comparative catalyst 7 | 0.0075 | 1.18 |

These data show that the catalysts of the invention provide polyether polyols having lower unsaturation levels and lower polydispersity than those obtained using other catalysts of the state of the art.

Example 9

Measurement of Catalyst Activity in the Synthesis of Polyols Using a Basic Initiator The same polymerization reaction as described in example 8 was carried out but replacing the acidic initiator by a basic initiator, i.e. a 700 mol. wt. polyether polyol previously synthesized by basic catalysis. Catalyst 3 is used in the polymerization reaction.

Table IV shows the results on catalyst activity for catalyst 3 using both types of initiators (basic and acidic).

TABLE IV

| | Catalyst activity using different initiators | | | |
|---|---|---|---|---|
| | Type of initiator | Activation time (min) | Catalyst activity (g/min) | Improvement percentage |
| Catalyst 3 | 700 mol. wt. polyether polyol triol previously synthesized by acidic catalysis | 9 | 35.7 | 28.4% |
| Catalyst 3 | 700 mol. wt. polyether polyol triol previously synthesized by basic catalysis | 12 | 27.8 | |

As shown in Table IV, there is a further synergistic effect derived from the use of a polyol synthesized by acidic catalysis, as a ligand of the catalyst and as an initiator of the polymerization reaction.

The invention claimed is:

1. A double metal cyanide complex catalyst produced by a process comprising:
   a) synthesizing a solid double metal cyanide catalyst in the presence of an organic complexing agent and a polyether polyol ligand; and
   b) first washing the catalyst obtained in step a) with an aqueous solution comprising:
      90-100% by weight of water; and
      0-10% by weight of a polyether polyol,
      to form a slurry, wherein the aqueous solution does not contain any organic complexing agent.

2. The double metal cyanide complex catalyst according to claim 1, wherein the process further comprises:
   c) isolating the catalyst from the slurry obtained in step b); and
   d) washing the solid catalyst obtained in step c) with a solution comprising:
      90-100% by weight of an organic complexing agent; and
      0-10% by weight of a polyether polyol,
      to form a slurry.

3. The double metal cyanide complex catalyst according to claim 1, wherein the synthesis of step a) comprises:
   producing a catalyst slurry by reacting an aqueous solution of a metal salt with an aqueous solution of a metal cyanide salt in the presence of an organic complexing agent;
   combining the catalyst slurry with a polyether polyol ligand; and
   isolating a polyether-containing solid catalyst from the slurry.

4. The double metal cyanide complex catalyst according to claim 1, wherein the polyether polyol ligand is synthesized by acidic catalysis.

5. The double metal cyanide complex catalyst according to claim 1, wherein the polyether polyol is a diol or a triol, having number average molecular weight lower than 2000.

6. The double metal cyanide complex catalyst according to claim 1, wherein the organic complexing agent is selected from monoalcohols, aldehydes, ketones, ethers, esters, amides, ureas, nitriles, sulfides and mixtures thereof.

7. The double metal cyanide complex catalyst according to claim 3, wherein the metal salt is selected from zinc chloride, zinc bromide, zinc acetate, zinc acetonylacetate, zinc benzoate, zinc nitrate, iron (II) sulfate, iron (II) bromide, cobalt (II) chloride, cobalt (II) thiocyanate, nickel (II) formate, nickel (II) nitrate and mixtures thereof.

8. The double metal cyanide complex catalyst according to claim 3, wherein the metal cyanide salt is selected from potassium hexacyanocobaltate (III), potassium hexacyanoferrate (II), potassium hexacyanoferrate (III) and calcium hexacyanocobaltate (III).

9. The double metal cyanide complex catalyst according to claim 1, wherein the synthesis of solid double metal cyanide catalyst is carried out at a temperature ranging from 30 to 70° C.

10. The double metal cyanide complex catalyst according to claim 1, which comprises:
    at least one double metal cyanide;
    at least one organic complexing agent; and
    at least one polyether polyol ligand having a number average molecular weight lower than 2000.

11. A process for polymerizing an epoxide, said process comprising reacting an epoxide and a hydroxyl group-containing initiator in the presence of a catalyst as defined in claim 1.

12. The process according to claim 11, wherein the hydroxyl group-containing initiator is a polyether polyol obtained by acidic catalysis.

13. The process according to claim 11, wherein the polymerization is carried at a temperature higher than 110° C.

14. A polyether polyol produced by a process as defined in claim 11.

15. The double metal cyanide complex catalyst according to claim 2, wherein the organic complexing agent is selected from monoalcohols, aldehydes, ketones, ethers, esters, amides, ureas, nitriles, sulfides and mixtures thereof.

* * * * *